United States Patent [19]

Esselin et al.

[11] Patent Number: 5,155,793
[45] Date of Patent: Oct. 13, 1992

[54] OPTICAL COMPONENT FOR APPLICATIONS IN INTEGRATED OPTICS

[75] Inventors: Sophie Esselin, Antony; Dominique Broussoux, Marcoussis; Pierre LeBarny, Orsay; Philippe Robin, Bourg La Reine, all of France

[73] Assignee: Thomson-CSF, Puteaux, France

[21] Appl. No.: 645,469

[22] Filed: Jan. 24, 1991

[30] Foreign Application Priority Data

Feb. 16, 1990 [FR] France .................. 90 01877

[51] Int. Cl.$^5$ ............................ G02B 6/10
[52] U.S. Cl. .................... 385/131; 385/143; 385/145
[58] Field of Search ............ 350/96.11, 96.12, 96.13, 350/96.14, 96.34; 385/129–132, 143, 145

[56] References Cited

U.S. PATENT DOCUMENTS

| 4,712,854 | 12/1987 | Mikami et al. | 350/96.12 |
|---|---|---|---|
| 4,749,245 | 6/1988 | Kawatsuki et al. | 350/96.12 |
| 4,958,895 | 9/1990 | Wells et al. | 385/130 |
| 5,016,958 | 5/1991 | Booth | 350/96.13 |
| 5,046,800 | 9/1991 | Blyler, Jr. et al. | 385/131 |
| 5,051,617 | 9/1991 | Normandin et al. | 385/130 X |

FOREIGN PATENT DOCUMENTS 2191603 12/1987 United Kingdom.

OTHER PUBLICATIONS

SPIE, vol. 971, Nonlinear Optical Properties of Organic Materials (1988), pp. 218–229, R. Lytel, et al., "Organic Electro-Optical Waveguide Modulators and Switches".

SPIE, vol. 824, Advances in Nonlinear Polymers and Inorganic Crystals, Liquid Crystals, and Laser Media, (1987), pp. 152–161, R. Lytel, et al., "Advances in Organic Electro-Optical Devices".

Applied Physics Letters, vol. 52, No. 13, Mar. 28, 1988, pp. 1031–1033, J. I. Thackara, et al., "Poled Electro-Optic Waveguide Formation in Thin-Film Organic Media".

Primary Examiner—John D. Lee
Attorney, Agent, or Firm—Oblon, Spivak, McClelland, Maier & Neustadt

[57] ABSTRACT

Disclosed is an optical component for applications in integrated optics, including a substrate that supports a stack of three polymer layers: a lower layer deposited on the substrate, a central layer and an upper layer, the lower and upper layers having optical indices smaller than that of the central layer which is electrooptical and designed to convey a light beam, the lower layer or the upper layer possessing zones having indices of different values to create a zone of confinement of the light beam in the central layer.

10 Claims, 7 Drawing Sheets

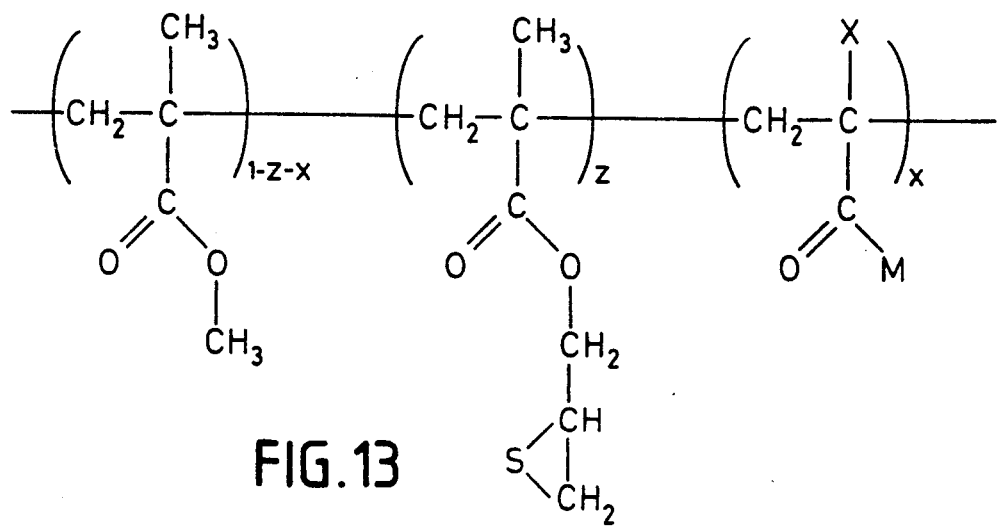
FIG.13
FIG.14
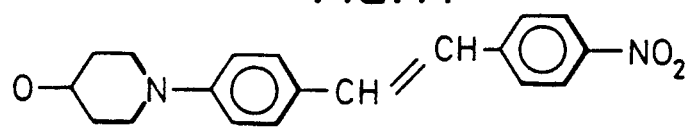
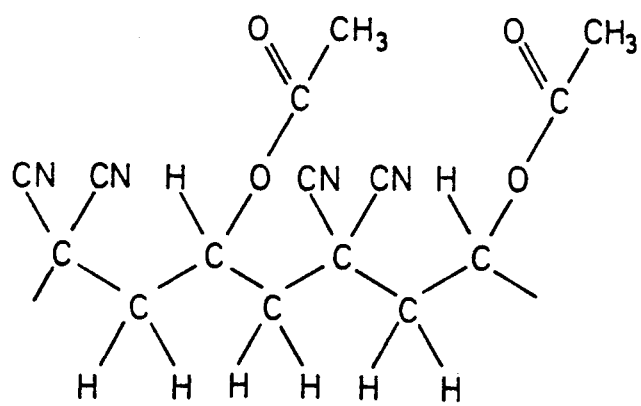
FIG.15

OPTICAL COMPONENT FOR APPLICATIONS IN INTEGRATED OPTICS

BACKGROUND OF THE INVENTION

1. Field of the Invention

The present invention relates to optical components for applications in integrated optics. These components may be active or passive components such as second harmonic generators, electrooptical modulators, electrooptical couplers or electrooptical switches with n inputs and n outputs.

2. Description of the Prior Art

There are known second harmonic generators for integrated optics formed by structures based on lithium niobate LiNbO$_3$ or formed by organic materials. These structures are constituted by a succession of microdomains with a pitch equal to the length of coherence:

$$1c = \frac{\lambda}{4}(n^{2\omega} - n^{\omega})$$

wherein each domain is polarized in reverse with respect to the neighboring domain. This enables a partial overlapping of the phases of the incident wave (with a pulsation $\omega$) and the created wave (with a pulsation $2\omega$). It is possible, notably, to double the infrared frequency ($\lambda = =0.86\ \mu m$) to obtain a blue light ($\lambda = 0.43\ \mu m$) with an LnNbO$_3$ structure formed by about a hundred domains (See the article by G. A. Magel, M. M. Fejer and R. L. Byer, "Second Harmonic Generation Of Blue Light In Periodically Poled Lithium Niobate", Cleo '89/Thursday Afternoon/350). It is also known that it is possible to make an organic structure that generates red light ($\lambda = 0.63\ \mu m$) and is formed by 300 inverted microdomains (see the article by G. Khanarian, D. Haas, R. Keosian, D. Karim and P. Landi, "Phase-Matched Second Harmonic Generation In A Polymeric Waveguide", Cleo '89/Thursday Morning/254).

With respect to the switches and the electrooptical modulators for integrated optics, the main structures used are complex structures on LiNbO$_3$ where the optical guides are formed by titanium doping. However, since it is not possible to obtain any thin layer of monocrystalline LiNbO$_3$, it is not possible to make any electrooptical modulator with facing electrodes. The electrodes are then arranged in a coplanar way, thus reducing the efficiency of the lithium niobate.

Recently, a first polymer-based electrooptical modulator has been developed and disclosed by the Lockheed Missiles And Space Company Inc. (Cf. R. Lytel, G. F. Lipscomb, M. Stiller, J. I. Thackara, A. J. Ticknor, *Organic Integrated Optical Devices*). It has been shown that the light can be confined laterally by simple localized polarization of an active layer. The variation in index obtained is of the order of $10^{-3}$ to $5.10^{-2}$: this is sufficient to obtain a lateral confinement.

The present invention concerns the making of optical components for applications in integrated optics such as the modulation of light and the generation of second harmonics by means of stacks of three carefully chosen polymer layers. Two of these layers are passive and have an optical index that is low enough to confine the optical mode in the central layer which has a high optical index and is formed by an active material. By acting locally on the index of one of the three layers, we obtain a lateral confinement of the light wave.

SUMMARY OF THE INVENTION

An object of the invention, therefore, is an optical component for applications in integrated optics, this component being prepared on a substrate, wherein the substrate supports a stack of three polymer layers: a lower layer deposited on the substrate, a central layer and an upper layer, the lower and upper layers having optical indices smaller than that of the central layer which is electrooptical and designed to convey a light beam, at least one layer of the three layers possessing zones having indices of different values to create a zone of confinement of the light beam in the central layer.

BRIEF DESCRIPTION OF THE DRAWINGS

The invention will be understood more clearly and other advantages will appear from the following description, which is given as a non-restrictive example, and from the appended drawings, of which:

FIG. 13 represents the chemical formula of a crosslinkable terpolymer that can be used to form the active layer in a structure according to the invention;

FIG. 14 represents a particular molecular grouping of the formula of FIG. 13;

FIG. 15 shows the chemical formula of another copolymer that can be used in a structure according to the invention;

DETAILED DESCRIPTION OF THE INVENTION

According to the invention, guides for integrated optics are made by the association of three chemically and optically compatible layers of polymer, wherein the adaptability of the chemical structure of the active layer makes it possible to optimize the three-layer structure obtained for a given application and a determined wavelength of operation. Furthermore, the fact that providing a difference in index on a surface constituting a guide makes it possible to obtain the lateral confinement of the light wave in a simple way.

Figure 1:
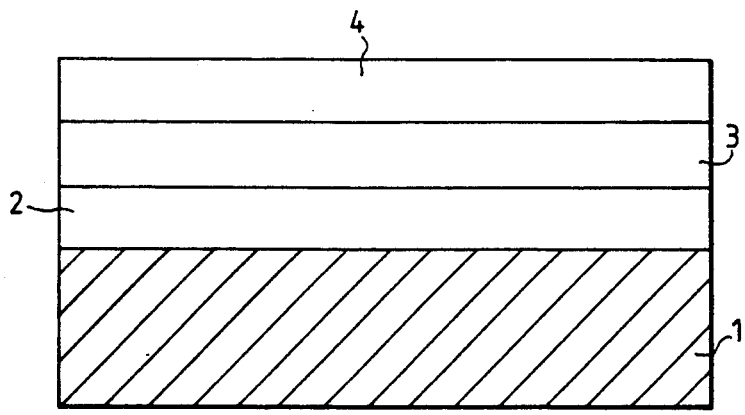
FIGS. 1 and 2 represent three-layered structures according to the invention.

FIG. 1 gives a schematic view of the three-layer structure according to the invention. A substrate 1 supports a stack of three layers: a lower layer 2, a central layer 3 and an upper layer 4. The central layer 3 has electrooptical properties and sufficient transparency in the wavelengths of operation. The lower layer 2 and the upper layer 4 have optical indices below that of the central layer.

It is easy to deposit these layers of polymer by coating with a solution of the polymer in a solvent. The three layers of polymer can thus be deposited successively on the substrate. In this case, the lower layer 2 should remain insoluble in the coating solvent for the central layer 3 and the coating solvent for the upper layer 4 should not dissolve the central layer (or active layer) 3.

Whatever the optical component that is to be made, for its subsequent use (as a modulator, coupler or switch), there is a step for the orientation of the central layer 3. This step necessitates the application of an electrical field. One of the electrodes needed to apply this electrical field could therefore be formed by the substrate 1. It could be chosen, for example, so as to be made of silicon or of glass covered with a layer of aluminium or a layer of ITO (indium-tin oxide).

Figure 2:
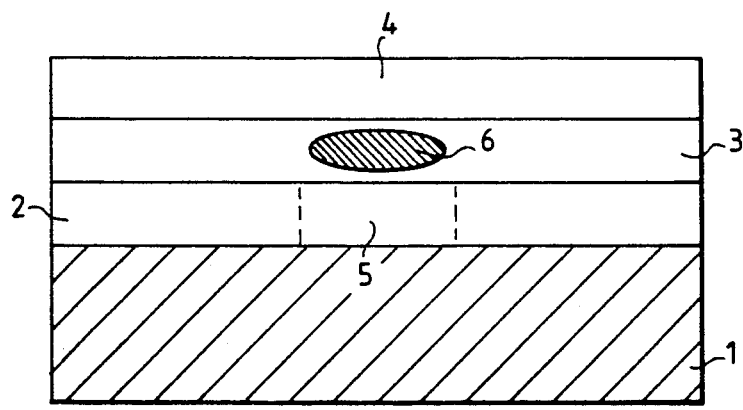

At this stage, the structure of FIG. 1 makes it possible to obtain a plane light guide but does not, as yet, enable the light to be confined in a two-dimensional guide. However, by altering the effective index of the active layer 3, i.e. by increasing the index of the lower layer 2 or that of the upper layer 4 on a surface constituting the guide structure, it is possible to confine the light conveyed by the active layer to certain zones. This is what is shown in FIG. 2 which repeats the three-layer structure shown in FIG. 1. In this example, the lower layer 2 includes a zone 5, demarcated by dashes, with a higher index than the rest of the layer 2. A variation in the index of the order of $10^{-3}$ may be enough to induce a confinement of the light in the active layer 3 to a sector 6 facing the zone 5.

Several methods can be used to obtain, on one and the same polymer layer, a zone with a higher index than that in the rest of this same layer.

A first method consists in irradiating zones of the lower layer or of the upper layer differently, to obtain zones with different indices and thus to obtain a confinement. The irradiated zones will have a higher index than the non-irradiated zones.

A second method consists in locally polarizing the lower layer or the upper layer if these layers are polarizable, i.e. if they have dipoles at the places enabling a guide to be constituted. Indeed, it is possible to increase the index by polarization.

A third method consists in causing a diffusion of dyes increasing the index at the desired places by expansion in a chemical solution.

We shall now describe some examples of methods for the making of three-layer structures according to the invention.

EXAMPLE 1

The example 1 concerns the irradiation of a three-layer structure, the lower layer 2 of which is formed out of a negative resin sensitive to X-rays and the upper layer 4 of which is formed out of a positive resin.

The different layers of polymers may be deposited by the so-called spin-coating method. It is thus possible to deposit layers with a thickness of about 1 μm.

Figure 3:
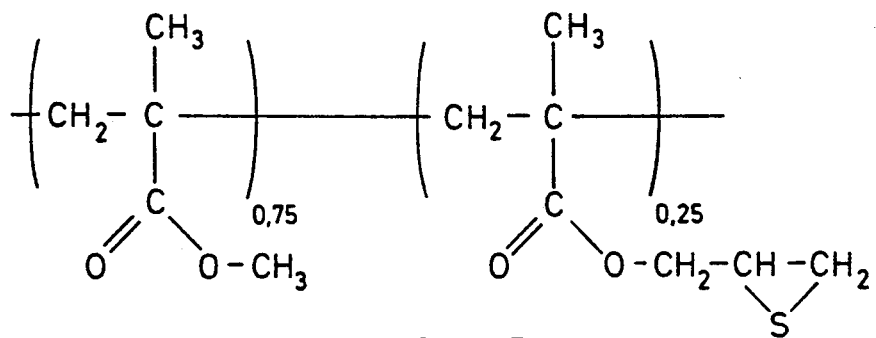
FIGS. 3 and 4 represent chemical formulae of the polymers that can be used to form passive layers in the three-layer structures according to the invention.

The negative resin forming the layer 2 may be a copolymer of methyl methacrylate and epithioglycidyl methacrylate such as the one shown in FIG. 3 and described in the French patent application No. FR 2 352 007.

Figure 4:
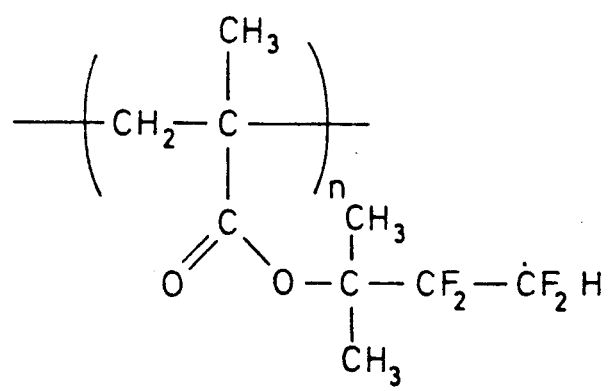

The positive resin forming the layer 4 may be the polymer 1,1 dimethyl 2,2,3,3 tetrafluoropropyl methacrylate, commercially available under the reference FPM 210 and shown in FIG. 4.

The use of such layers is warranted by their low optical index (n<1.5) and their compatibility with the central layer 3. Thus, the lower layer 2 is not dissolved by the coating solvent for the central layer 3, and the upper layer 4 gets deposited without the central layer's being dissolved by the coating solvent for this upper layer 4.

Figure 5:
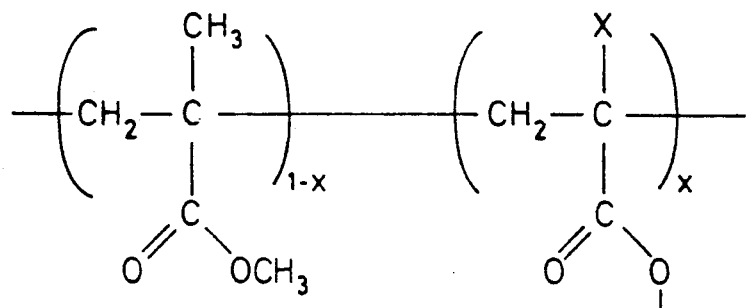
FIG. 5 represents the general chemical formula of an eletctro-active copolymer that can be used to form active layers in the structures according to the invention.
Figure 5:
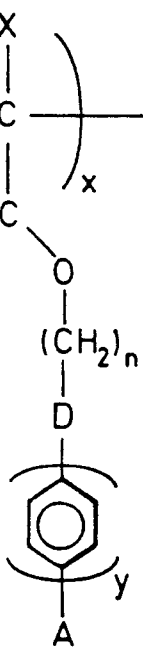

The central layer or active layer may be formed by copolymers, the general structure of which is shown in FIG. 5. These are electro-active copolymers for which: X is $CH_3$, H or Cl, n may be zero or may have a value of 2 to 15, y is equal to 1 or 2 and x is between 0 and 1. D is an atom or a donor grouping of electrons such as oxygen, sulphur, $>N-C_pH_{2p+1}$ with

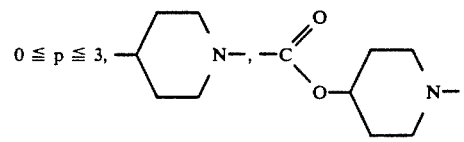

$0 \leq p \leq 3$,

A is an acceptor grouping of electrons such as:

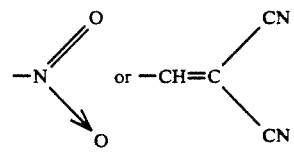

Variants of this general structure, which are particularly adapted to the invention, are shown in FIGS. 6 to 11.

Figure 6:
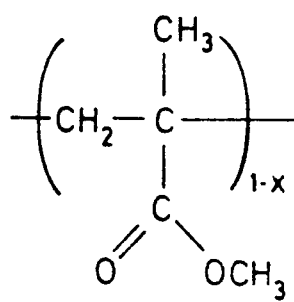
FIGS. 6 to 11 represent variants of the copolymer of FIG. 5.
Figure 6:
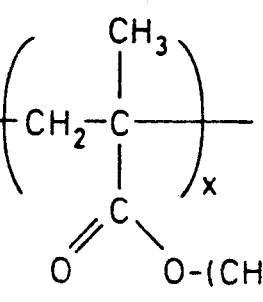

FIG. 6 shows the formula of the copolymer [methyl methacrylate 4 (methacryloyloxypropyloxy) 4'nitrobiphenyl]. The copolymers for which x=0.51 and x=0.268 have been tested and have proved to be satisfactory.

Figure 7:
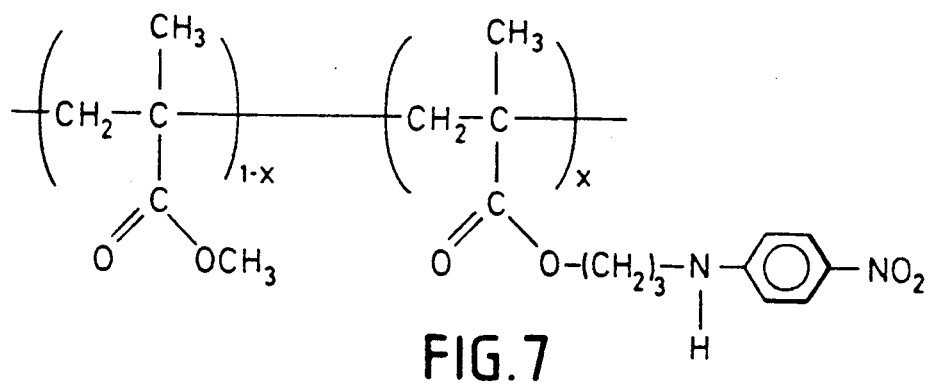

FIG. 7 shows the formula of the copolymer [methyl methacrylate 4 (N-methacryloyloxypropylamino) nitrobenzene]. The copolymer for which x=0.236 has been tested and has proved to be satisfactory.

Figure 8:
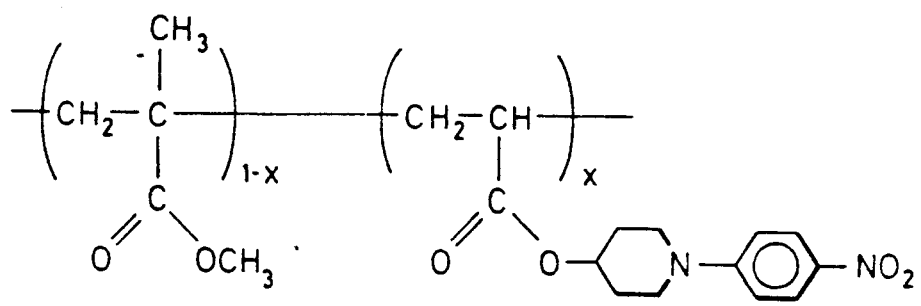

FIG. 8 shows the formula of the copolymer [methyl methacrylate 4 (4'-acryloyloxypiperidino) nitrobenzene]. The copolymer for which x=0.169 has been tested and has proved to be satisfactory.

Figure 9:
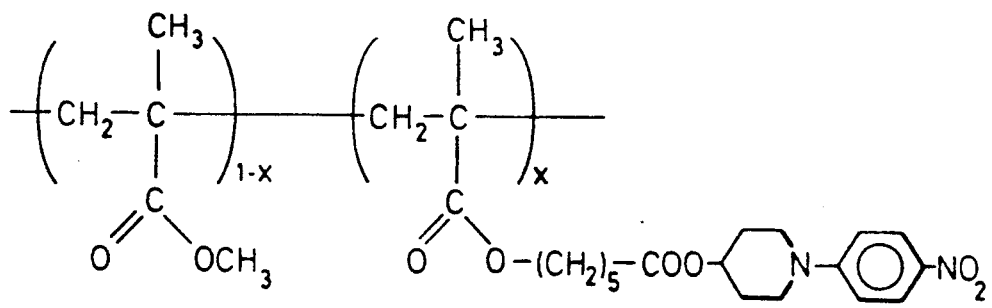

FIG. 9 shows the formula of the copolymer [methyl methacrylate 4 (methacryloyloxyhexanoyloxypiperidino) nitrobenzene]. The copolymers for which x=0.046 (glass transition temperature Tg=103° C.), x=0.113 (Tg=100° C.), x=0.2 (Tg=80° C.), x=0.476 (Tg=75° C.), and x=1 (Tg=50° C.) have been tested and have proved to be satisfactory.

Figure 10:
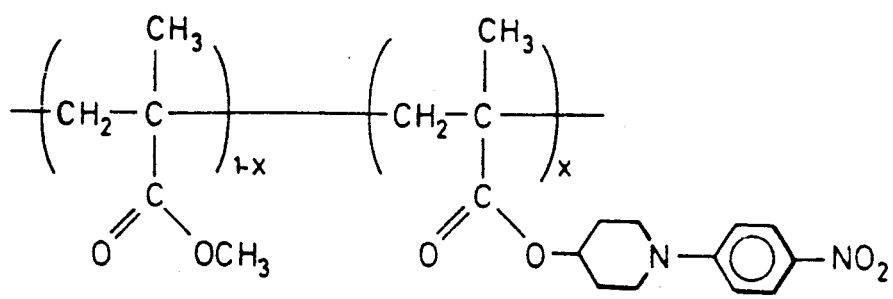

FIG. 10 shows the formula of the copolymer [methyl methacrylate 4 (methacryloyloxypiperidino) nitrobenzene]. The copolymer for which x=0.27 and x=0.27 (Tg=146° C.) has been tested and has proved to be satisfactory.

Figure 11:
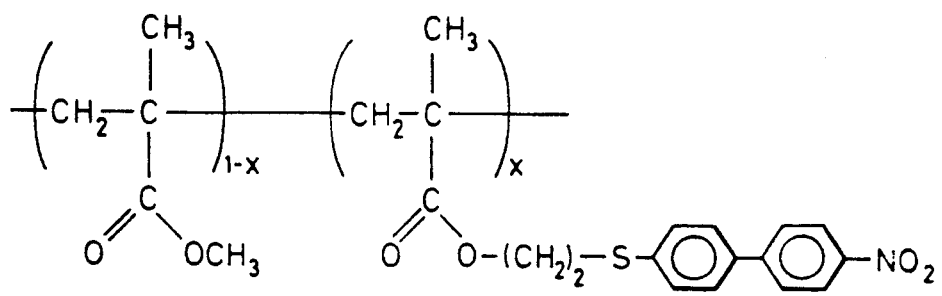

FIG. 11 shows the formula of the copolymer [methyl methacrylate -4 (methacryloyloxyethylthio) 4' nitrobiphenyl]. The copolymer for which x=0.25 has been tested and has proved to be satisfactory.

Figure 12:
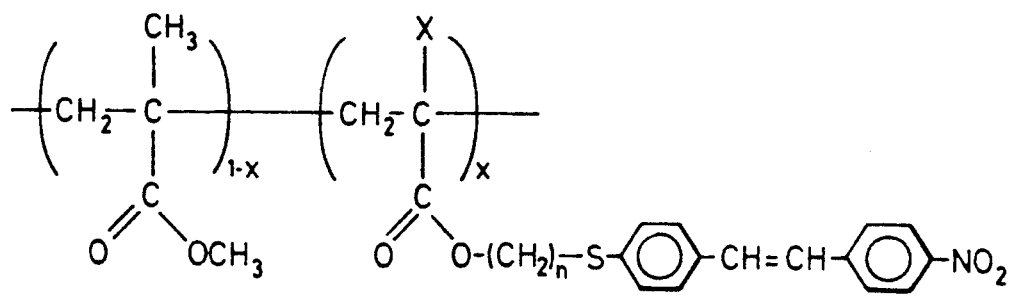
FIG. 12 represents the general chemical formula of another electro-active copolymer that can be used to form active layers in the structures according to the invention.

The central layer can also be formed by copolymers having the general structure shown in FIG. 12. These are electro-active copolymers for which: X is CH₃, H or Cl, x is between 0 and 1 and $2 \leq n \leq 15$.

All these copolymers have a second-order non-linearity coefficient $d_{33}$ between 5 and 30 pm/V under excitation at 1.06 μm and maximum absorption values between 330 and 420 nm depending on whether they have a nitrogen atom or a sulphur atom and one or more aromatic nuclei.

The zone of confinement in the active layer may be obtained by localized irradiation of the lower layer, thus creating zones with a different index in this layer.

EXAMPLE 2

The example 2 concerns a three-layer structure having lower and upper layers that are the same as those of the example 1 but using, as an active layer, a terpolymer yjzy od cross-linkable under X-rays. The formula of this terpolymer is shown in FIG. 13. This terpolymer is described in the French patent application FR 2 630 744. The parameters x and z meet the following relationships:

$$0.25 \leq \frac{z}{1 - x - z} \leq 0.5 \text{ and } x \leq 0.3$$

The radical X represents CH₃, H or Cl. The grouping M may be the one shown in FIG. 14 or the following one:

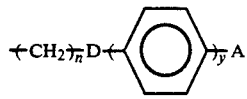

A, D as well as the values of n and y being the same as those announced for FIG. 5.

The advantage of using this terpolymer is that the stability of orientation of the molecules in time is increased by cross-linkage in volume while, at the same time, a two-dimensional confinement of the light wave is achieved by irradiating the guide zone differently from the rest of the layer.

The three-layer structure according to this example may be made in the following way. The lower layer is deposited with a methylethylcetone solution. An annealing operation is performed at 100° C. under vacuum for one hour. This layer is then irradiated by X-rays with an energy of 10 mJ/cm². The central layer is deposited with a solution of 1,1,2 trichloroethane. An annealing operation is also carried out at 100° C. under vacuum for one hour. Then a layer of 2 to 3 μm of a positive resin (FPM 210 for example) is deposited by means of a toluene solution which is annealed under the same conditions as before. This layer of positive resin is irradiated by ultraviolet rays through an aluminium mask designed so that the insolated zone of this layer is the one located above the planned confinement zone. The insolated resin is then eliminated and a 200 angstrom thick aluminium layer is deposited under vacuum. Between the aluminium layer and the substrate which is conductive (or has been made superficially conductive) a polarizing voltage representing an electrical field of 1 MV/cm is applied at the same time as an irradiation by X-rays. The entire active layer is therefore polarized, but it is only the part of the active layer not covered with resin that is cross-linked by the X-rays. The aluminium layer is eliminated by soda and the rest of the resin FPM 210 is eliminated by toluene. Through heating to a temperature of about 120° C. for one hour, the non-irradiated zones of the central layer are then depolarized. Thus a polarized zone, hence a zone with a higher index, has been created in the central layer. All that remains to be done is to deposit the upper layer, for example a layer made of FPM 210.

EXAMPLE 3

In this example, we show the method of creating a zone with a higher index in the lower layer.

A solution of negative resin, containing 10% of a polymer with aminonitrostilbene dye in 1,1, 2 trichloroethane, is deposited on the substrate by spin-coating. The solvent is evaporated. The layer is then irradiated with X-rays with an energy of 10 to 50 mJ/cm². It is then insolated under the effect of ultraviolet rays through a mask shielding the guide zone. This insolation may last one hour and may be carried out by means of a 250 W xenon lamp. Its purpose is to destroy the dye in the insolated zones. In this way, the non-irradiated zone is a zone with a high index. The subsequent deposits of the active zone and of the upper zone are then made. Finally, an aluminium guide electrode is deposited on the upper layer. An electrical field applied to the structure by means of this guide electrode and of the substrate which is conductive (or has been made superficially conductive) enables the active layer to be locally polarized.

EXAMPLE 4

Example 4 concerns a three-layer structure using a copolymer based on vinylidene cyanide and vinyl acetate in a molar ratio of 50/50. This copolymer can be designated by the term P(VDCN-VAc) and is soluble in dimethylformamide. This material has the advantage of having a very high glass transition temperature (about 180° C.) and its structure has 50% of strong dipoles C≡N which give it piezoelectrical and pyroelectrical properties when they have been oriented beforehand under an electrical field. FIG. 15 shows this copolymer. The drawback of this material is that it has a very low index (n≈1.47) and relatively low efficiency and non-linearity ($d_{33}=0.6$ pm/V at 1.06 μm). This gives an electrooptical coefficient $r_{33}$ approximately equal to 0.4 pm/V. However, when this material is doped with compatible dyes, it may be used advantageously in the three-layer structure according to the invention.

Figure 16:
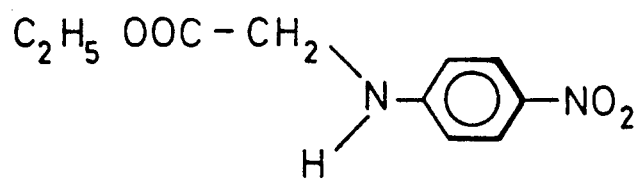
FIGS. 16 to 20 represent chemical formulae of dopants that can be used in the copolymer of FIG. 15.
Figure 17:
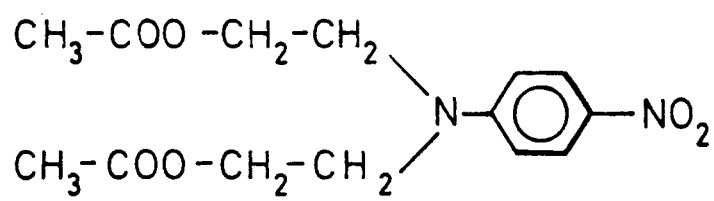
Figure 18:
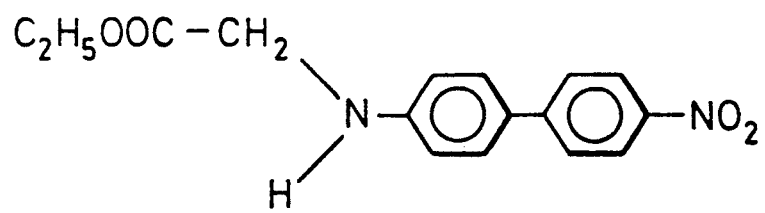
Figure 19:
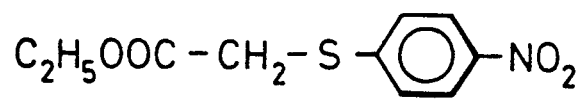
Figure 20:
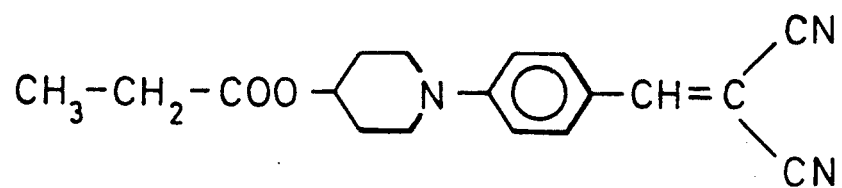

Thus the following dopants may be used:

4 (N ethylamino acetate) nitrobenzene, the formula of which is shown in FIG. 16. This dopant has a maximum absorption value for a wavelength of 357 nm (UV spectrum made with chloroform as a solvent), 4(N,N diethanolamino acetate) nitrobenzene, the formula of which is shown in FIG. 17. This dopant has a maximum absorption value for a wavelength of 378 nm (UV spectrum made with chloroform as a solvent), 4(N ethylamino acetate) 4' nitrobiphenyl, the formula of which is shown in FIG. 18. This dopant has a maximum absorption value for a wavelength of 374 nm (UV spectrum made with chloroform as a solvent), the sulphide of 4(nitrophenyl) and ethyl acetate, the formula of which is shown in FIG. 19. This dopant has a maximum absorption value for a wavelength of 332 nm (UV spectrum made with chloroform as a solvent), 4(dicyanovinyl 4'(propanoyloxypiperidino)phenyl, the formula of which is shown in FIG. 20. This dopant has a maximum absorption value for a wavelength of 428.5 nm (UV spectrum made with chloroform as a solvent).

The three-layer structure according to the example 3 includes a lower layer made of P(VDCN=VAc) with an index n=1.47, a central layer that is made of the same copolymer but is doped at a rate ranging from 1% to 50% in moles, thus giving an index varying from 1.48 to 1.56 and an upper layer based on commercially available resin FPM 210 (referred to in the example 1) with an index n=1.42. Before the deposition of the central layer, the lower layer is hardened by annealing at 100° C. for one hour to prevent it from being dissolved in the solvent of the central layer.

For example, with a copolymer P(VCDN—VAc) with 25% in moles of 4(N ethylamino acetate) nitrobenzene, the formula of which is shown in FIG. 16, it was possible to obtain a structure of the type shown in FIG. 1, a control voltage $v_\pi$ of about 80 volts for a coefficient $d_{33}$ of 2 pm/V and a coefficient $r_{33}$ of about 1 pm/V with maximum absorption at 370 nm. In this case, the three-layer structure was formed by layers with a thickness of 2 μm, deposited on a silicon substrate.

The zone with a higher index can be obtained in the lower layer in the same way as for the example 3.

EXAMPLE 5

Figure 21:
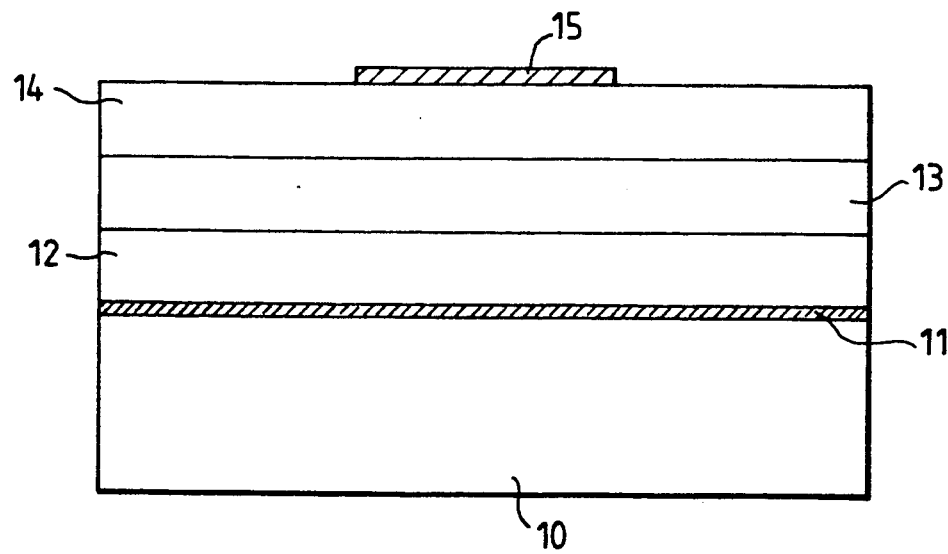
FIG. 21 shows an electrooptical modulator according to the invention.

Example 5 concerns a three-layer structure according to the invention, used as an electrooptical modulator and shown in FIG. 21.

On a substrate 10 covered with an electrode 11 made of ITO, the following were deposited successively on the electrode 11 side: three layers 12, 13 and 14, each having a thickness of 2 μm and a length of 1 cm. The lower layer 12 is formed out of a negative resin sensitive to X rays, and its index n is equal to 1.5. The upper layer 14 is formed out of a positive resin such as the one commercially available under the reference FPM 210, referred to further above, and its index n is equal to 1.42. The central layer 13, with an index n=1.56, is constituted by the copolymer shown in FIG. 7, which has been doped with 25% in moles of dye. An aluminium electrode 15 was deposited on the layer 14 to apply a control voltage between this layer 14 and the electrode 11. For a maximum absorption value at 370 nm, on a material polarized at 80 V/μm around 100° C., the voltage $V_\pi$ obtained is equal to 70 volts. The same structure, made with the same materials but with a total thickness of 4 μm (each layer having the same thickness) should make it possible to obtain a voltage $v_\pi$ of below 30 volts for a polarization field of 100 V/μm. By using the same copolymer for the central layer doped at 50% by weight of dye and by optimizing the conditions of manufacture of the structure, it should be possible to obtain a voltage $v_\pi$ of below 10 volts.

What is claimed is:
1. An optical component, which comprises:
a lower polymer layer which has a first index of refraction and which extends in longitudinal and transverse directions;
an upper polymer layer which has a third index of refraction, is above said lower layer, and extends in longitudinal and transverse directions;
a middle polymer layer made of an electrooptically active material which has a second index of refraction, extends in longitudinal and transverse directions, has a lower surface and an upper surface, is connected to said lower polymer layer by said lower surface, is connected to said upper polymer layer by said upper surface, said second index of refraction being greater than the first and third indices of refraction, said middle polymer layer has a longitudinally extended waveguide region which extends in the longitudinal direction and has lateral confinement in the transverse direction; and
means, including a longitudinally extended modified index of refraction region in one of the upper layer and the lower layer that has an index of refraction which is different from the index of refraction of the rest of the same layer and is adjacent to said longitudinally extended waveguide region, for laterally confining light to said longitudinally extended waveguide region.

2. An optical component according to claim 1, wherein:
one of said longitudinally extended modified index of refraction region and the remainder of the layer containing said longitudinally extended modified index of refraction region includes dyes.

3. An optical component according to any one of claims 1 and 2, wherein:
the middle layer includes dopants that increase the index of refraction of the middle layer.

4. An optical component, which comprises:
a lower polymer layer which has a first index of refraction and which extends in longitudinal and transverse directions;
an upper polymer layer which has a third index of refraction, is above said lower layer, and extends in longitudinal and transverse directions;
a middle polymer layer made of an electrooptically active material which has a second index of refraction, extends in longitudinal and transverse directions, has a lower surface and an upper surface, is connected to said lower polymer layer by said lower surface, is connected to said upper polymer layer by said upper surface, said second index of refraction being greater than the first and third indices of refraction, said middle polymer layer has a longitudinally extended waveguide region which extends in the longitudinal direction and has lateral confinement in the transverse direction;
means, including a longitudinally extended modified index of refraction region in one of the upper layer and the lower layer that has an index of refraction which is different from the index of refraction of the rest of the same layer and is adjacent to said longitudinally extended waveguide region, for laterally confining light to said longitudinally extended waveguide region, wherein:
one of said longitudinally extended modified index of refraction region and the remainder of the layer containing said longitudinally extended modified index of refraction region is irradiated.

5. An optical component according to claim 4, wherein:
the lower layer includes a negative resin which is sensitive to X-rays and the upper layer includes a positive resin.

6. An optical component according to claim 5, wherein: the middle layer includes a cross-linkable polymer.

7. An optical component according to claim 4, wherein: the middle layer includes a cross-linkable polymer.

8. An optical component, which comprises:
a lower polymer layer which has a first index of refraction and which extends in longitudinal and transverse directions;
an upper polymer layer which has a third index of refraction, is above said lower layer, and extends in longitudinal and transverse directions;
a middle polymer layer made of an electrooptically active material which has a second index of refraction, extends in longitudinal and transverse directions, has a lower surface and an upper surface, is connected to said lower polymer layer by said lower surface, is connected to said upper polymer layer by said upper surface, said second index of refraction being greater than the first and third indices of refraction, said middle polymer layer has a longitudinally extended waveguide region which extends in the longitudinal direction and has lateral confinement in the transverse direction;
means, including a longitudinally extended modified index of refraction region in one of the upper layer and the lower layer that has an index of refraction which is different from the index of refraction of the rest of the same layer and is adjacent to said longitudinally extended waveguide region, for laterally confining light to said longitudinally extended waveguide region, and wherein:
one of said longitudinally extended modified index of refraction region and the remainder of the layer containing said longitudinally extended modified index of refraction region is polarized.

9. An optical component according to any one of claims 4, 8, 5, 7 and 6, wherein:
the middle layer comprises dopant that increases the index of refraction of the middle layer.

10. An optical component, which comprises:
a lower polymer layer which has a first index of refraction and which extends in longitudinal and transverse directions;
an upper polymer layer which has a third index of refraction, is above said lower layer, and extends in longitudinal and transverse directions;
a middle polymer layer which has a second index of refraction, extends in longitudinal and transverse directions, has a lower surface and an upper surface, is connected to said lower polymer layer by said lower surface, is connected to said upper polymer layer by said upper surface, said second index of refraction being greater than the first and third indices of refraction, said middle polymer layer has a longitudinally extended waveguide region which extends in the longitudinal direction and has lateral confinement in the transverse direction; and
means, including a longitudinally extended modified index of refraction region in one of the upper layer and the lower layer that has an index of refraction which is different from the index of refraction of the rest of the same layer and is adjacent to said longitudinally extended waveguide region, for laterally confining light to said longitudinally extended waveguide region.

* * * * *